Oct. 5, 1926.
C. DAUB
1,602,068
MOTOR
Filed Nov. 8, 1924     2 Sheets-Sheet 1
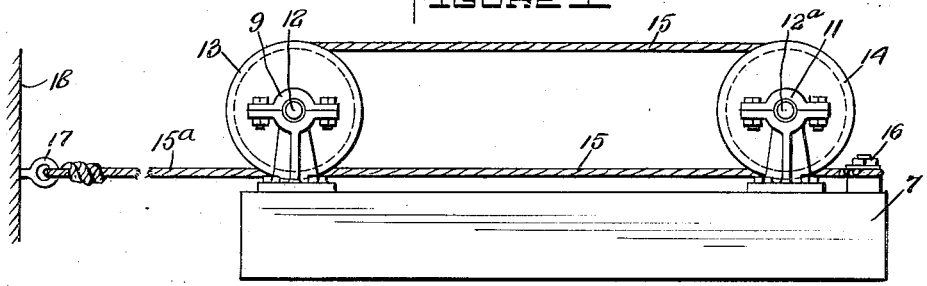
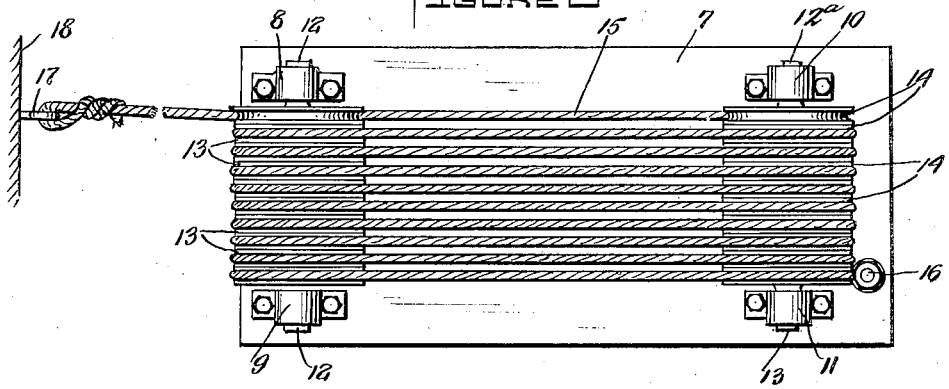
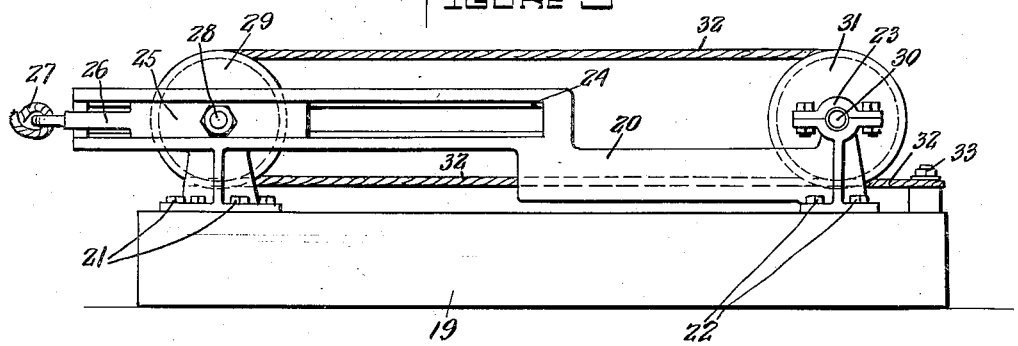
INVENTOR
*Charles Daub*
BY *Walton Harrison*
ATTORNEY Oct. 5, 1926.
C. DAUB
MOTOR
Filed Nov. 8, 1924  2 Sheets-Sheet 2
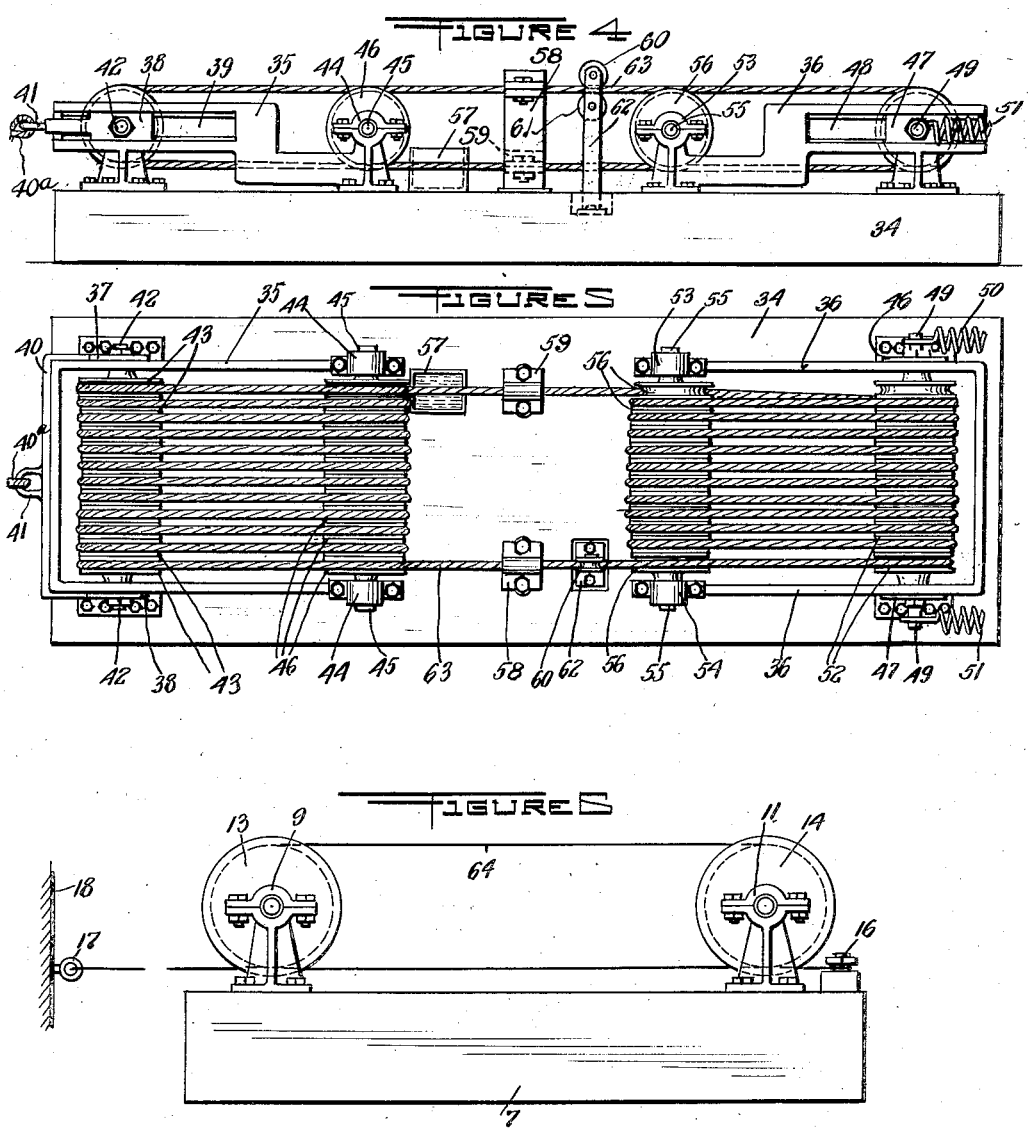
INVENTOR
CHARLES DAUB
BY Walton Harrison
ATTORNEY Patented Oct. 5, 1926.

1,602,068

UNITED STATES PATENT OFFICE.

CHARLES DAUB, OF NEW YORK, N. Y.

MOTOR.

Application filed November 8, 1924. Serial No. 748,749.

My invention relates to motors, and especially to motors of a type in which one or more longitudinal members, preferably of considerable length, are caused to undergo contraction and become shortened, and in doing this to produce an expenditure of power.

More particularly stated, I seek to make a motor in which I take advantage of the tendency of a rope or its equivalent to contract and thus become shortened whenever it is wet and to become elongated upon drying.

In some instances I seek to use the thermal expansion and contraction of a metallic wire or other metallic member, preferably of considerable length, so arranged as to become lengthened by heating and shortened by cooling, and thus to exert an expenditure of power, thus operating the motor.

Reference is made to the accompanying drawing forming a part of this specification, and in which like reference characters indicate like parts throughout the several figures.

Figure 1 is a side elevation showing one form of my motor, in which a single rope is wound back and forth upon a number of pulleys, in such manner that the lengthening and shortening of the rope, due to its becoming wet or dry, is cumulative.

Figure 2 is a plan view of the mechanism appearing in Figure 1.

Figure 3 is a side elevation showing another form of my device, which differs from the structure shown in Figures 1 and 2 by having the rope so arranged that various subdivisions thereof pull together as a unit in order to exert great power but develop relatively small velocity or speed.

Figure 4 is a side elevation showing my device in Figure 3 but with the addition of a drying rack for the rope.

Figure 5 is a plan view of the mechanism shown in Figure 4.

Figure 6 is a side elevation, showing another form of my device similar to the one appearing in Figures 1 and 2, with the exception that I use a wire, lengthened and shortened by the application and withdrawal of heat, instead of a rope.

Mounted upon a base 7 are bearings 8, 9, 10, 11, and supported by these bearings are two shafts 12, 12ª.

Carried by the shaft 12 and loose relatively thereto are a number of grooved pulleys 13, revoluble independently of each other. The shaft 12ª is similarly provided with an equal number of grooved pulleys 14, all loose.

A single rope 15 is secured by one of its ends to a fastening 16, and is wound back and forth upon the grooved pulleys 13 and 14. This rope is preferably quite lengthy, and is provided with a portion 13ª which extends some distance and is secured by a fastening 17 to a suitable load 18.

The rope 15 is made of cotton, hemp, tough grass or any other suitable material such as, upon becoming wet, will enable the rope to contract or to become shortened and which when dried out will cause the rope to increase in length.

The load 18 may be a building wall to be straightened up or pulled down as the case may be, or it may be a heavy safe to be moved, a stranded ship to be dislodged, or in fact any unusually heavy load to be moved a short distance.

The operation of the mechanism shown in Figures 1 and 2 is as follows:

The parts being assembled and arranged as illustrated and described, and the rope 15 being drawn taut at the start and being dry, water is showered freely upon all portions of the rope. The result is that the rope absorbs a portion of the water by capillarity, and becomes thereby swollen in size and correspondingly shortened. Since the two shafts 12 and 13 always remain the same distance apart, the portions of the rope extending from the pulleys 13 to the pulleys 14, in contracting, simply cause the pulleys to turn. This winds up all or a portion of the extending part 15ª, of the rope, so that a powerful pull is made upon the load 18, and this load is moved accordingly.

After the operation is complete the rope is allowed to dry. For this purpose it may be exposed to the action of the sun, or may be dried out by artificial heat as occasion may require.

In the form of my device appearing in Figure 3 I have a base 19, and mounted securely upon this base is a stout frame 20 made of metal, preferably steel, and secured in position by bolts 21, 22. This frame is provided with bearings, one of which is shown at 23, and also with a pair of slideways, one of which is shown at 24.

Mounted on these slideways are a pair of slides one of which appears at 25, these slides being connected by a yoke 26. To this yoke a cable 27 or other tensile member is secured, so as to be readily connected with the load to be moved.

A shaft 28 extends through the two slides, and carries a number of grooved pulleys 29 similar to the grooved pulleys 13, 14, above described. Another shaft 30 is supported by the bearings mentioned, and carries a number of grooved pulleys 31, similar to the grooved pulleys 14 above described.

A rope 32 is secured at one of its ends to a fastening 33, and is wound back and forth upon the pulleys 29 and 31.

The opposite end of this rope is similarly secured, to a fastening like the fastening 33, but not shown.

The apparatus shown in Figure 3 differs from that appearing in Figures 1 and 2 in that the shaft 28, because supported in slides as described, is movable bodily toward and from the shaft 30. A further difference in the apparatus is that the rope 32 does not extend out to the left according to Figure 3. Each portion of the rope 32, located between the two sets of pulleys, simply becomes longer and shorter, but this does not cause the pulleys to turn continuously, although each pulley can turn slightly in either of two directions, in order to equalize such strains as may be developed from time to time.

Thus in order to pull a light load for a relatively long distance and at a relatively high velocity I use the apparatus shown in Figures 1 and 2; but for a heavier load to be moved a shorter distance and at a lower velocity I employ the form shown in Figure 3.

In the form of my device appearing in Figures 4 and 5 the various parts are mounted upon a base 34. There are two U-frames 35, 36, as may be understood from Figure 4. The U-frame 35 is provided with a pair of slides 37, 38, each slide being mounted in a slideway 39, as indicated in the upper left hand portion of Figure 4. A yoke 40 is connected with the two slides 37 and 38, and carries an eye 40ª. A cable 41 is connected with this eye and extends therefrom to the load, which is not shown in this figure, but is of the general type of the load 18 above described and shown in Figures 1 and 2.

The slides 37 and 38 carry a shaft 42, and loosely mounted upon this shaft are a number of grooved pulleys 43. The frame 35 is provided with a pair of bearings 44, and supported by these bearings is a shaft 45. This shaft does not rotate, and carries a number of grooved pulleys 46, loose relatively to each other.

The U-frame 36 carries a pair of slides 46, 47 as shown more particularly at the right of Figure 5, each slide 46, 47 being mounted in a slideway 48.

The slides 46 and 47 carry a shaft 49, which does not rotate. Engaging the ends of this shaft are a pair of tensile springs 50 and 51, these springs being so mounted that they tend to shift the shaft 49 to the right according to Figure 5. The shaft 49 carries a number of grooved pulleys 52 mounted loosely upon it.

The frame 36 is provided with a pair of bearings 53, 54 and supported by these bearings is a shaft 55. Loosely mounted upon this shaft are a number of grooved pulleys 56.

A water tank appears at 57, and is here shown conventionally.

Mounted upon the frame 34 are a pair of rope clamps 58, 59, used as hereinafter described.

A pair of wringer rolls 60 and 61, are mounted upon a bracket 62 supported by the base 34.

An endless rope is shown at 63, and extends through the rope clamps 58 and 59, and between the roller wringers 60 and 61, and also through the water tank 57. Otherwise, the rope 63 is like the ropes 15 and 32 described. It is wound back and forth around the grooved pulleys 43 and 46 and is also wound back and forth around the grooved pulleys 56 and 52.

The rope may be shifted by hand, so that a given portion of the rope can be transferred from the grooved pulleys 43 and 56 to the grooved pulleys 56 and 52, and vice versa.

The operation of the construction shown in Figures 4 and 5 may be readily understood from the foregoing description.

The various parts having been properly assembled, the cable 41 connected with the weight to be moved, and the rope clamps 58 and 59 being tightened, the device is ready for use.

All portions of rope extending from the groove pulleys 43 to the groove pulleys 46 being wet, either by having passed through the water tank 57 or by water showered upon them in any convenient way, these portions of the rope begin to swell and therefore to shorten. Thus they shift the grooved pulleys 43, together with the shaft upon which they are mounted, bodily to the right according to Figure 6; and in doing this they cause the yoke 40 to pull upon the cable 41, and thus to dislodge or move the weight which is to be operated upon.

After the work is done, or at least finished to the extent thus far described, the wet portion of the rope is shifted from the grooved pulleys 43 and 46 to the grooved pulleys 56 and 52. This may be done in any convenient way, the rope being moved by hand. For this purpose the rope clamps 58 and 59 are of course loosened in order to allow the rope to travel freely.

As the rope passes between the wringer rollers 60, the water it contains is in great measure squeezed out. The portion of the rope containing the residue of the water is brought into such position as to occupy the grooved pulleys 56 and 52 and is thus fully exposed or spread out, as may be understood from the right hand portion of Figure 5.

This portion of the rope is now allowed to dry out and this can be done without interfering with the other portion of the rope, occupying the grooved pulleys 43 and 46.

By this arrangement, at any particular time approximately one-half of the entire length of the rope may be drying while the other half of the rope, having been previously wet as described, is doing the work of pulling the load. Thus alternately each half of the rope is wet and dry and this means that it is alternately lengthened and shortened.

Referring broadly to the structure shown in Figures 4 and 5, the left-hand portion of the apparatus is the one in which the rope, by shortening, does its work; and the right-hand portion serves the general purpose of a drying rack.

The construction shown in Figure 6 is like that appearing in Figure 1, with the exception that instead of a rope I use a stout wire or cable 64 of metal, the lengthening and shortening of this member being caused by varying its temperature and thus causing the wire or cable as a whole to lengthen and shorten. In other words, the action of the construction illustrated in Figure 6 is thermal and not capillary.

I do not limit myself to the precise mechanism shown, as variations may be made therein without departing from my invention, the scope of which is commensurate with my claims.

Having thus described my invention what I claim as new and desire to secure by Letters Patent is as follows:

1. A motor comprising a pair of shafts, pulleys mounted thereupon and free to turn, slide mechanism supporting one of said shafts to enable it to move bodily in relation to the other, a lengthy contractile rope member wound back and forth upon said pulleys and adapted to change in length when moistened and dried, means for moistening and drying said contractile rope member, and mechanism connected with said contractile rope member and coacting therewith for moving a load.

2. In a motor the combination of a base, a U-frame mounted thereupon and provided with slideways, slides mounted in said slideways and movable relatively to said U-frame, a shaft carried by said slides, a plurality of pulleys carried by said shaft and revoluble independently of each other, another shaft journaled upon said U-frame, a contractile member wound around said first mentioned pulleys and around said second mentioned pulleys, and means for connecting said slides with a load to be moved.

3. In a device of the character described the combination of a base, a plurality of U-frames mounted upon said base and provided with slideways, slides mounted in said slideways, revoluble shafts supported by said slides, grooved pulleys mounted upon said shafts, other shafts journaled directly upon said U-frames, a single rope connected with all of said pulleys and extending from one of said U-frames to another, means for moistening said rope, and mechanism controllable by said rope for moving a load.

4. A device of the character described, comprising a base, a pair of U-frames mounted upon said base, grooved pulleys supported by said U-frames, a rope engaging said grooved pulleys, means for moistening a portion of said rope while another portion thereof is drying, means for drying said last mentioned portion, and means for utilizing the shortening of said rope as it absorbs moisture, for the purpose of moving a load or the like.

5. In a motor the combination of a pair of frames each provided with slideways, slides mounted in said slideways, shafts supported by said slides, other slides journaled directly upon said frames, grooved pulleys mounted upon all of said shafts and revoluble thereupon independently of each other, a single endless rope wound upon all of said grooved pulleys and adapted to lengthen and shorten as said rope is dried out or moistened.

Signed at New York, in the county of New York and State of New York, this 1st day of November, 1924.

CHARLES DAUB.